Patented Feb. 8, 1949

2,461,358

UNITED STATES PATENT OFFICE

2,461,358

DIOLEFIN POLYMERIZATION IN THE PRESENCE OF AMMONIUM SOAP EMULSIFIER

Byron M. Vanderbilt, Westfield, N. J., and Frances Bascom, Staten Island, N. Y., assignors to Standard Oil Development Company, a corporation of Delaware No Drawing. Application June 1, 1946, Serial No. 673,896

6 Claims. (Cl. 260—84.5)

This invention pertains to the production of synthetic rubber-like materials and particularly to the production of such materials by emulsion polymerization.

Synthetic rubber-like, as well as resinous materials have been prepared by the polymerization of conjugated diolefins such as butadiene-1,3 and its homologues or by the copolymerization of such diolefins with unsaturated comonomers such as styrene, alpha methyl styrene, vinyl naphthalene, acrylonitrile, methacrylonitrile, methyl methacrylate, ethyl fumarate, methyl vinyl ketone and the like. The preparation of these synthetic rubber-like materials is usually effected in aqueous emulsion using a compound capable of liberating oxygen such as hydrogen peroxide, benzoyl peroxide, alkali metal perborates, and persulfates or the like as catalysts. Emulsifiers used in this process have included water soluble soaps such as alkali metal oleates, stearates or palmitates as well as various synthetic surface active emulsifying agents such as salts of alkylated naphthalene sulfonic acids, fatty alcohol sulfates and also certain acid addition salts of high molecular weight alkyl amines.

In the preparation of certain synthetic rubber-like materials, especially copolymers of conjugated diolefins such as butadiene, isoprene and the like with an acrylic nitrile such as acrylonitrile and methacrylonitrile, it has been found that superior results are obtained if the fatty acid used for the formation of emulsifier is only partially neutralized with an alkali such as sodium or potassium hydroxide. U. S. Patent No. 2,366,325, dated January 2, 1945, for example, discloses that the highest rate of polymerization in diolefin or diolefin-comonomer reaction systems is obtained if the palmitic or myristic acid is only 70-95% neutralized, thereby providing free fatty acid in the system in a concentration in excess of that which is equivalent to the concentration of hydroxyl ions present.

We have now found that when ammonium soaps are utilized as the emulsifier in the diolefin-acrylic nitrile reaction system, the ratio of fatty acid to total ammonia used in preparing the ammonium soap emulsifier is quite different from the ratio of fatty acid to sodium hydroxide or potassium hydroxide and instead of using a molecular excess of fatty acid over fixed alkali, it is definitely advantageous to provide a molar excess, within fairly narrow limits, of ammonia over fatty acid. This is, of course, directly contrary to the express teachings of the prior art with respect to the use of sodium or potassium soaps.

The present invention is applicable to the production of copolymers of conjugated diolefins with an acrylic nitrile. Suitable diolefins include butadiene-1,3, isoprene, piperylene, dimethyl butadiene, methyl pentadiene and the like. The acrylic nitriles which may be used include acrylonitrile, methacrylonitrile as well as the chloro- and bromo-substitution products thereof. The diolefins and the acrylic nitriles may be used in a ratio of from about 10 to about 85 wt. per cent of diolefin to about 15 to about 90 wt. per cent of an acrylic nitrile. As a rule, if rubbery products are desired, the diolefin constitutes a major proportion of the mixtures while hard, leathery or resinous products are formed if the nitrile constitutes a major proportion of the mixture.

Fatty acids which may be used for the production of ammonium soap emulsifiers in accordance with the present invention contain from about 12 to about 20 carbon atoms per molecule. Such acids include fatty acids such as oleic, linoleic, palmitic, stearic, myristic, lauric acids and the like. Instead of using a single acid, mixtures of acids may be used, especially such commercial mixtures as are obtained by the hydrolysis of naturally occurring fats or oils. A particularly useful mixture of acids is that obtainable by the hydrolysis of tallow followed by a selective hydrogenation of the polyolefinic acids contained therein. Abietic acid and rosin acids in general are also useable although fatty acids are preferred.

Ammonia is utilized to neutralize the soap forming fatty acid and is supplied in sufficient amount that there is present from about 5 to about 75% and preferably from 25 to 50% molar excess of ammonia over that required to react with or completely neutralize the fatty acid.

The polymerization reaction is carried out at temperatures of up to about 45° C., although the reaction temperatures are variable depending to a considerable extent upon the presence or absence of polymerization activators such as morpholine and water soluble cyanides as well as polymerization modifiers such as dialkyl xanthogen disulfides or aliphatic mercaptans containing from 6 to about 18 carbon atoms per molecule. The polymerization is preferably conducted in the presence of an aliphatic mercaptan containing about 12 carbon atoms such as dodecyl mercaptans or mercaptans prepared from commercial $C_{12}$ alcohols which contain minor amounts of $C_{14}$ and $C_{16}$ mercaptans.

The following examples are given in order to illustrate the present invention.

Example 1.—A series of experiments were carried out using the following reaction mixture:

| | Parts |
|---|---|
| Butadiene | 74 |
| Acrylonitrile | 26 |
| Water | 200 |
| Dodecyl mercaptan | 0.5 |
| Potassium persulfate | 0.3 |
| Morpholine | 0.1 |
| Oleic acid | 3.0 |
| Ammonia | Variable |

Each of the runs was carried out for 15 hours at 25° C. The data obtained are summarized in the following table:

| Per cent Molar Excess $NH_3$ Over That Required to React With the Oleic Acid | Per cent Conversion | Mooney Viscosity |
|---|---|---|
| −5 | 78 | 76 |
| 5 | 77 | 66 |
| 25 | 77 | 47 |
| 50 | 74 | 59 |
| 100 | 63.5 | 102 |

It may be seen that although the reaction rate was satisfactory at the lower degree of neutralization, softer products were obtained when 25–50% molar excess of ammonia was used. However, use of as much as 100% excess of ammonia not only led to a slower reaction rate but also to a much tougher and less plastic product.

Example 2.—Butadiene-acrylonitrile copolymers were prepared in a 3-gallon autoclave equipped with turbo type agitation. The recipe used was the same as that in Example 1 except that 3½ parts of oleic acid was used. In one case only 95% of the theoretical amount of ammonia was used while in the other 125% (i. e. a 25% molar excess) of the theoretical amount of ammonia was used. Both runs were carried out at 30° C. until the monomers were about 73% converted to polymers. The latices were stripped, stabilized and coagulated. The Williams Plasticity-Recovery and the Mooney Viscosity of the polymers were determined and the polymers were compounded according to the following recipe, cured and the tensile strength ultimate elongation and modulus at 300% elongation was determined.

Recipe for vulcanization:

| | Parts |
|---|---|
| Polymer | 100 |
| Carbon black | 50 |
| Zinc oxide | 5 |
| Benzo thiazyl disulfide | 1 |
| Sulfur | 1.5 |

The results obtained with the samples as thus prepared as well as a comparative sample prepared in the usual way using a sodium soap as emulsifier are summarized in the following table:

| | Run Using 95% of $NH_3$ | Run Using 125% of $NH_3$ | Run Using Sodium Soap |
|---|---|---|---|
| Time to reach 73% Conversion........hours.. | 12¾ | 11¼ | 12 |
| Williams Plasticity-Recovery (10 Kg.) | 102–7 | 83–4 | 99–6 |
| Mooney Viscosity | 63 | 44 | 72 |
| Tensile - Elongation - Modulus: | | | |
| Cure 30′ @ 265° F | [1] 203–950 | [1] 1100–995 | [1] 105–1010 |
| Cure 60′ @ 265° F | 2250–810–480 | 3490–760–770 | 3120–800–620 |
| Cure 90′ @ 265° F | 2810–730–700 | 3820–695–865 | 3900–850–890 |

[1] Modulus at 300% elongation was too low to be significant.

It may be seen therefore that the use of the larger amount of ammonia gave a faster polymerization rate and yielded a polymer which not only was more plastic than that prepared with 95% of the theoretical amount of ammonia but it was also faster curing and had superior properties when vulcanized. The polymer prepared with 125% of the theoretical amount of ammonia was superior to that prepared with sodium soap in that the former is more plastic, i. e., has lower Williams and Mooney values and also cured more rapidly.

The latices prepared with ammonium soaps as emulsifying agents are particularly useful when films or dip goods are prepared from the latices. Due to the volatile nature of ammonia and its low basicity, under the drying conditions usually employed for deposited latices, ammonium soaps decompose to give the corresponding free fatty acids which have excellent water resistance as compared to the soaps.

In removing unreacted monomers from latices containing ammonium soaps, free ammonia tends to come off with the unreacted monomers, and it is often necessary to replace at least a part of the ammonia so lost in order to maintain a stable latex during the stripping and subsequent handling operations. The ammonia going overhead can easily be recovered and reused in subsequentn polymerization batches.

Although we prefer to use a mixture of ammonium soap and ammonia as the sole emulsifying system, it may be used with minor amounts of other emulsifiers such as sodium and potassium soaps and the neutral type emulsifiers such as sodium alkyl sulfates and the like. For example, in systems containing a total of 6% of emulsifier, we could use up to about 2% of a sodium or potassium soap or up to about 1–1.5% based on the water phase of a neutral type emulsifier such as sodium di- or triisobutyl sulfate or sulfonate.

The foregoing examples are merely illustrative of the present invention and it will be understood that numerous variations are permissible without departing from the purview of the following claims:

What we claim and desire to secure by Letters Patent is:

1. The process of producing aqueous emulsion polymerizates of mixtures of a butadiene-1,3 hydrocarbon and an acrylic nitrile which comprises using as the emulsifying agent a minor proportion of a mixture of a soap-forming fatty acid and from 5 to about 75% molar excess of ammonia over that required to react with the fatty acid.

2. The process of producing aqueous emulsion polymerizates of mixtures of a butadiene-1,3 hydrocarbon and an acrylic nitrile which comprises using as the emulsifying agent a minor proportion of a mixture of oleic acid and from 25 to about 50% molar excess of ammonia over that required to react with the fatty acid.

3. The process of producing aqueous emulsion polymerizates of mixtures of a butadiene-1,3 hydrocarbon and acrylonitrile which comprises using as the emulsifying agent a minor proportion of a mixture of soap-forming fatty acids and from 5 to about 75% molar excess of ammonia over that required to react with the fatty acid.

4. The process of producing aqueous emulsion polymerizates of mixtures of a butadiene-1,3 hydrocarbon and acrylonitrile which comprises using as the emulsifying agent a minor proportion of a mixture of a soap-forming fatty acid having 12 to 20 carbon atoms per molecule and from 25 to about 50% molar excess of ammonia over that required to react with the fatty acid.

5. The process of producing synthetic rubber-like materials which comprises polymerizing a mixture of a major proportion of a butadiene-1,3 hydrocarbon and a minor proportion of an acrylic nitrile in aqueous emulsion using a minor proportion of a mixture of a soap-forming fatty acid and from 5 to about 75% molar excess of ammonia over that required to react with the fatty acid as the emulsifying agent.

6. The process of producing synthtetic rubber-like materials which comprises polymerizing a mixture of a major proportion of butadiene 1-1,3 and a minor proportion acrylonitrile in aqueous emulsion using a mixture of about 1.5 weight percent based on the amount of water of a soap-forming fatty acid and from 25 to about 50% molar excess of ammonia over that required to react with the fatty acid as the only emulsifying agent.

BYRON M. VANDERBILT.
FRANCES BASCOM.

REFERENCES CITED

The following references are of record in the file of this patent:

UNITED STATES PATENTS

| Number | Name | Date |
|---|---|---|
| 2,385,172 | Vanderbilt et al. | Sept. 18, 1945 |